United States Patent
Abernathy

[15] 3,659,449
[45] May 2, 1972

[54] COMBINATION RIVET INSTALLATION APPARATUS AND SELF-DRILLING RIVET

[72] Inventor: Robert G. Abernathy, Richmond, Ind.
[73] Assignee: Avco Corporation, Richmond, Ind.
[22] Filed: Mar. 13, 1970
[21] Appl. No.: 19,216

[52] U.S. Cl. .................................................. 72/391, 29/523
[51] Int. Cl. ............................................................. B21d 9/05
[58] Field of Search ................. 72/391, 114; 29/523; 85/70, 85/71

[56] References Cited

UNITED STATES PATENTS

| | | |
|---|---|---|
| 2,437,191 | 3/1948 | Gill ..................................... 72/114 |
| 3,047,182 | 7/1962 | Batten ................................. 72/391 |
| 3,412,594 | 11/1968 | Lund ................................... 72/391 |

*Primary Examiner*—Charles W. Lanham
*Assistant Examiner*—Gene P. Crosby
*Attorney*—Charles M. Hogan and Eugene C. Goodale

[57] ABSTRACT

A rivet installation apparatus for use in cooperation with self-drilling rivets is disclosed. The disclosure provides for the installation of a rivet through two or more sheets of material, said installation being accomplished from one side. With this apparatus and rivet combination, an operator may place two or more sheets of material together, drill a hole through the sheets and upset the rivet while operating from one side of the material in one operation with a single tool.

7 Claims, 5 Drawing Figures

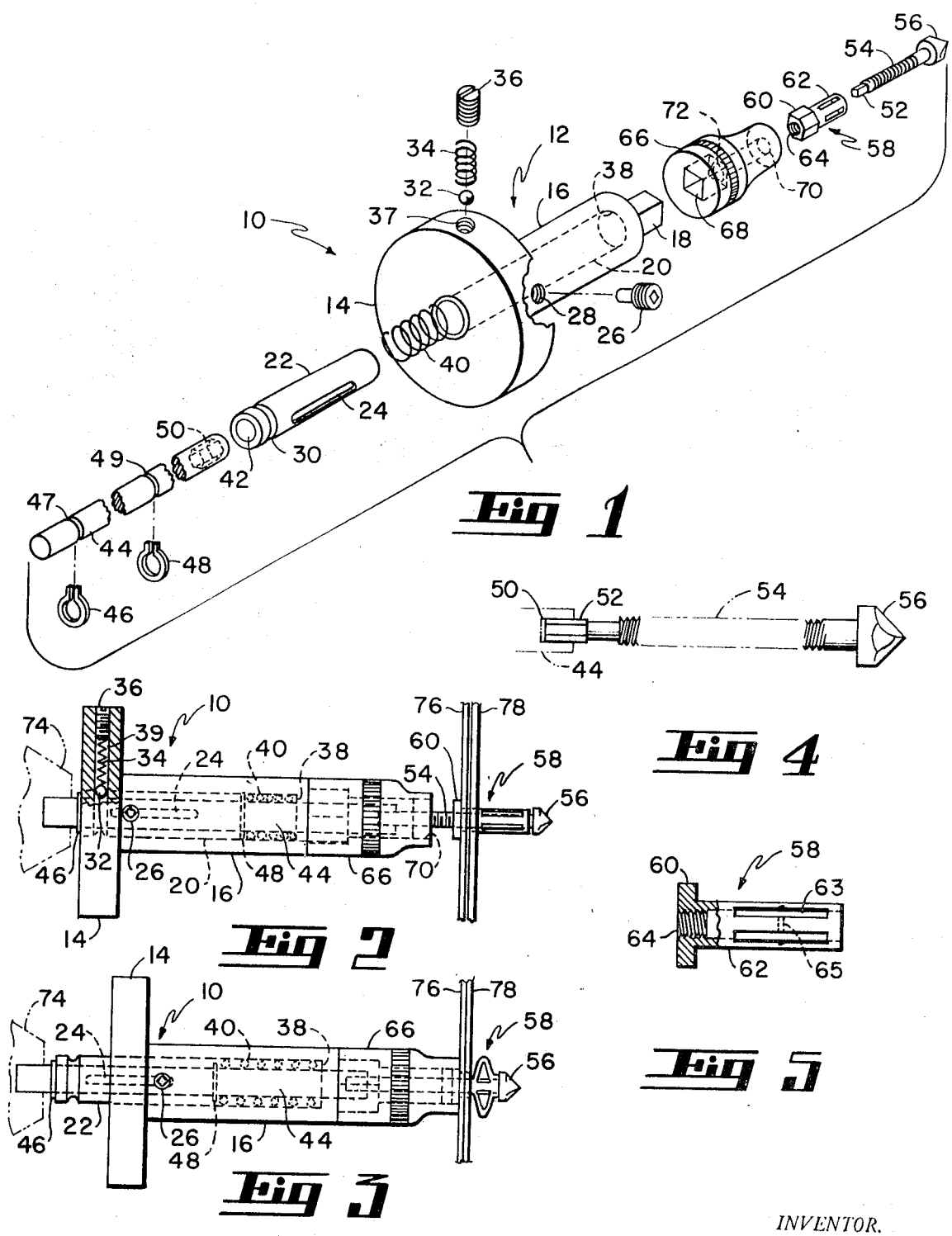

COMBINATION RIVET INSTALLATION APPARATUS AND SELF-DRILLING RIVET

BACKGROUND OF THE INVENTION

This invention relates generally to the field of rivets and more particularly this invention concerns a power driven rivet installation apparatus and self-drilling rivet for particular utilization in areas where one side of the rivet cannot be reached for work.

In recent years, the field of art of riveting has greatly improved from the original riveting methods, i.e., drilling holes in members, aligning the members, clamping the members so the holes are aligned, inserting a rivet through the aligned holes and then providing a means to "buck up" the rivet on one side while a rivet upsetter is employed on the other side. Recent improvements in this field include the development of "blind" and self-drilling rivets, all of which require special tooling and adaptation for proper use in the blind areas. These improvements are still not entirely satisfactory since each device has a limited use. In other words, a tool used with one type of rivet may not readily be usable with the same type of rivet but of a second size. In addition, many of the prior installation apparatus and rivets required elaborate mechanism to insure that the rivet head is maintained stationary during the upsetting of the rivet. Additional tools may be required to hold the rivet in place. Often times the rivet is so formed that it is required to engage the material that is being riveted, i.e., a locking tab will cut into the surface or an oversize portion of the rivet will frictionally engage and co-act with the aperture through the parts to be riveted.

Accordingly, it is one object of this invention to provide an improved rivet installation apparatus for use in cooperation with self-drilling rivets.

Another object of this invention is to provide a rivet installation apparatus having means to conveniently accept rivets of varying head dimensions.

A further object of this invention is to provide, in combination with a self-drilling rivet, rivet installation apparatus having a means for positively engaging the rivet head during upsetting to insure against rotational movement of the rivet and the parts to be riveted.

SUMMARY OF THE INVENTION

This invention provides in combination an improved rivet installation apparatus for use in cooperation with a self-drilling rivet wherein the steps of drilling the rivet hole, inserting the rivet and upsetting the rivet are performed from one side. The installation apparatus is of simple and economical construction, is easy to operate and provides means to positively engage the rivet head to locate the rivet in position to prevent turning of the rivet during upsetting. Rivet heads of different dimensions are readily acceptable for use with the installation apparatus.

Other details, uses and advantages of this invention will become apparent as the following description of an exemplary embodiment thereof presented in the accompanying drawings proceeds.

BRIEF DESCRIPTION OF THE DRAWINGS

The accompanying drawings show a present exemplary embodiment of this invention in which:

FIG. 1 is an exploded perspective view of the installation apparatus and self-drilling rivet;

FIG. 2 is a partial section of the preferred embodiment of FIG. 1 showing the apparatus and tool just prior to upsetting of the rivet;

FIG. 3 is a view of the preferred embodiment of FIG. 1 in partial section showing the apparatus during the upsetting stage;

FIG. 4 is a view of the drill bit; and

FIG. 5 is a view partially in section of the deformable rivet body.

DESCRIPTION OF THE ILLUSTRATIVE EMBODIMENT

Reference is now made to FIG. 1 of the drawings, which illustrates, in exploded view, an exemplary embodiment of this invention in which the rivet installation apparatus is designated generally by the reference numeral 10. The rivet installation apparatus 10 is comprised of a main portion or outer housing 12. The outer housing 12 of the rivet installation apparatus is an elongate member having an enlarged head member 14 at one end of a shank or body member 16. The other end of the body member 16 terminates in a formed portion 18.

The outer housing 12 is formed with a bore 20 extending completely therethrough and in which tubular retainer member 22 is slidably inserted. Retainer member 22 has a longitudinal slot 24 formed axially thereon. A slot engaging insert 26 threadably engages the threads of aperture 28 formed in the body member 16. The end of insert 26 extends into the slot 24 to co-act therewith. Thus, the insert member 26 will permit limited longitudinal movement of the retainer member 22 relative to the outer housing 12 but will prohibit rotational movement of retainer 22.

The retainer member 22 has a uniform bore 42 extending therethrough and through which a drive shaft 44 extends. The shaft 44 extends axially outward from each end of retainer 22. The retainer member 22 is held in place against longitudinal movement relative to the drive shaft 44 by spring clips 46 and 48 which are placed in corresponding grooves 47 and 49 about the drive shaft 44. With the spring clips 46 and 48 in place, the drive shaft 44 has free rotational movement relative to the retainer member 22 but is not free for longitudinal or axial movement relative thereto. One end 50 of the drive shaft 44 is formed to mate with a complementary formed end 52 of a self-drilling rivet shank 54.

As best seen in FIG. 4, the drill rivet shank 54 has an integrally formed drilling head 56 at one end. The shank or main body portion 54 is threaded substantially the entire length from head 56 to the formed end 52.

Referring to FIG. 5, the rivet body 58 comprises a formed head 60 and a tubular portion 62 extending therefrom. The head 60 may be of any geometric shape which will readily permit a positive engagement thereof as will be explained herebelow. The rivet body 58 has threads 64 formed only at the head 60 end. The tubular portion 62 has a plurality of longitudinal slots 63 and an annular internal "V" cut or groove 65 formed thereon. The slots 63 and groove 65 weaken the tubular portion 62. Thus, when the rivet shank 54 is inserted through rivet body 58 and the drill head 56 drawn towards rivet head 60 by the co-action of the threaded portion 54 and internal threads 64, the tubular portion 62 will readily deform and collapse in a well-known manner.

Referring again to FIG. 1, it is seen that a groove or channel 30 is formed approximate one end of the retainer member 22. A detent mechanism is mounted in the head member 14 to engage groove 30. In the illustrative embodiment described, the detent mechanism comprises a ball 32 and compression spring 34 which are placed in bore 39 formed in the head member 14. A set screw 36 threadably engages threads 37 of bore 39 in the member 14 to maintain the spring 34 and ball 32 in place.

The bore 20 is formed such that an internal shoulder 38 is formed approximate one end of the body member 16. A compression spring 40 is inserted in the bore 20 and abuts at one end against the shoulder 38. The other end of the spring 40 acts against retainer member 22 to urge said retainer member axially outward from the housing 12. The retainer member 22 is limited in its outward movement by the slot engaging member 26. The member 26 limits both outward and inward axial movement of the retainer 22 relative to the housing 12. The retainer member 22 may be urged axially inward against the force of the spring 40 to a first operational position in which the ball 32 of the detent mechanism engages groove 30. The co-engagement of the ball 32 and groove 30 is sufficient to overcome the outward urging force of the spring 40. Since ball 32 is held in place by spring 34, it may be seen that the detent mechanism may be disengaged by the application of an axial force sufficient to overcome the radial force of spring 34. Thus, when the detent ball 32 has been disengaged from the groove 30, the housing 12 and retainer member 22 are free for axial sliding movement relative to one another, said axial movement being limited by the longitudinal slot 24 and slot engaging member 26. Although the detent means has been described as a spring and ball plus cooperating groove, it is apparent that other similar detent means might be employed.

One end of a rivet engaging means or socket 66 has a shaped internal land or passage 68 formed complementary with the shaped end 18 of the housing 12 in order that the socket 66 may slidably fit on the shaped portion 18 of the housing 12. The other end of the socket 66 is formed with an internal shape 70 complementary with the shape of the rivet head 60 such that the head 60 may be slidably inserted in said shaped portion. A bore 72 is formed through the rivet holding means 66 such that drive shaft 44 may extend therethrough.

In use, the apparatus 10 is assembled as shown in FIG. 2. One end of the drive shaft 44 is secured in the chuck 74 of a drill or the like. The drive shaft 44, with the retainer member 22 secured thereto, is inserted through the bore 20 of the outer housing 12 to the first operational position wherein the detent ball 32 engages the groove 30 of the retaining member 22. In this position, the spring 40 is seen to be compressed. The rivet engaging socket 66 abuts with the end of the tubular shank member 16. The formed end 50 of drive shaft 44 extends through the socket 66 to engage or mate with the formed end 52 of the rivet shank 54, said drill shank 54 having previously been threadably inserted through the rivet body 58.

In operation, the materials to be fastened together, such as two pieces of material or the like 76 and 78, are placed in proximity to one another. The drill or the like is actuated and the drill tip 56 drills its own hole through the pieces 76 and 78. It should be noted that the diameter of the drill head 56 is slightly larger than the outer diameter of tubular portion 62 of the rivet head 58. During this initial operation, there is a clearance between the end of socket member 66 and the rivet head 60. Hence, when the drill is actuated, the rotational force is transmitted via drive shaft 44, mating portions 50 and 52, and shank 54 to the drill head 56. The outer housing 12 may be held stationary or allowed to rotate in conjunction with the drive shaft 44 depending on the wishes of the operator. The only criteria are that there be clearance between the end of socket 66 and rivet head 60. After the drill tip 56 drills through members 76 and 78, the rivet body 58 follows through and seated against one surface of member 76, as shown in FIG. 2.

In order to upset or collapse the rivet body 58, the outer housing 12 is initially urged axially toward member 76. The axial force overcomes the spring 34 force holding ball 32 in groove 30 and releases the retainer member 22 for longitudinal movement relative to the housing 12. Once the detent means has been overcome and released, the socket 66 is seated against the piece 76. In this operational position, the head 60 is slidably fitted within the complementary shaped portion 70 of socket 66 such that the head 60 is positively engaged. The socket 66 then holds the rivet body 58 from turning. Thus, when the drill 74 is again engaged and the outer housing 12 and socket 66 are held stationary, the threaded shank 54 will co-act with the internal threads 64 in the head portion of the rivet body 58 and causes the tubular portion 62 to collapse outwardly in a known manner. As the collapsing of the tubular portion 62 continues, the drive shaft 44 and retainer member 22 axially retract relative to the housing 12 a corresponding distance equal to the collapsing distance of the portion 62. Continued rotational movement of the threaded shank 54 within the internally threaded head 60 causes the drill head 56 to pull the lower, non-threaded portion of tubular member 62 toward the head 60. This causes the tubular portion 62 to bulge outwardly and the continued rotational action causes the outward bulging or deformation as shown in FIG. 3 which pulls the pieces 76 and 78 tightly together and remain tightly held together by the upset rivet head 58.

Continued shaft rotation will cause the shank 54 to be jammed in the threads of the head 60. The drill shaft may be so designed that, when the excess torque is applied, the shank may break off and fall from the collapsed rivet body leaving no appreciable protrusion on either side of the two parts. In other desirable applications, the upsetting operation is stopped just prior to the jamming or when the rivet is just snug with regard to the pieces being riveted. The drill may be then reversed and the threaded shank 54 will drop out on the far side of piece 78. Hence, a threaded hole for mounting a bolt remains.

It has been found that rivet bodies 58 having a hexagonally shaped head 60 are very advantageous from the standpoint that the rivet engaging member 66 may be a socket from the common everyday tool box. Hence, if the rivet head 60 changes from a one-half inch on one job to three-fourths inch on another job, it is only necessary to remove the one-half inch socket member 66 and replace it with a three-fourths inch socket member. The end 50 for receiving and mating with the shaped end 52 may have a bushing inserted therein, not shown, for insuring proper axial alignment of the drill shaft 54 relative to the drive shaft 44. The mating or engaging portion 50 may be formed integrally in the shaft 44 as shown or a socket may be threadably inserted in the shaft so as to receive the complementary formed end 52. It is also possible to include a spring detent type member in the portion 50 so that the drill rivet will be snugly held and not drop out should the apparatus be pointed downwardly.

It can be seen that it is possible to drill and upset a rivet from the operator's side in substantially one operation and that this invention provides for the positive engagement of the rivet body during upsetting.

While a present exemplary embodiment of this invention has been illustrated and described, it will be recognized that this invention may be otherwise variously embodied and practiced by those skilled in the art.

What is claimed is:

1. In combination a rivet installation apparatus and self-drilling rivet comprising:
   a housing having a bore therethrough;
   a drive shaft having free rotational and longitudinal movement relative to said housing extending through the bore, one end of said drive shaft being rotationally driven by a power source and the other end of said shaft adapted to engage one end of a self-drilling rivet;
   means for limiting the longitudinal movement of said drive shaft relative to said housing;
   a rivet head engaging means at one end of said housing, said engaging means having a bore therethrough wherein said drive shaft extends therethrough for cooperative engagement with said one end of the self-drilling rivet,
   retention means for longitudinally positioning said housing relative to said drive shaft to provide a first operational position wherein said other end of said drive shaft engages the one end of said self-drilling rivet and wherein said rivet head engaging means is longitudinally spaced from the rivet head so that rotation of said drive shaft causes a like rotation of said self-drilling rivet and rivet head; and
   means urging said housing to a second operational position upon release of said retention means wherein said rivet head engaging means engages the rivet head to prevent rotational movement of said rivet head whereby continued rotational movement of said drive shaft provides an upsetting of the rivet body.

2. The combination as set forth in claim 1 in which said means for limiting the longitudinal movement of said drive shaft relative to said housing comprises:
   a retainer member coaxially mounted about said drive shaft and having a longitudinal slot formed thereon, said drive shaft having free rotational movement relative to said retainer member;
   a slot engaging member attachable to said housing and extending into the bore for engagement with the slot formed in said retainer member wherein axial movement of said retainer member is limited by said slot engaging member;

positioning means for preventing longitudinal movement of said retainer member relative to said drive shaft.

3. The combination as set forth in claim 2 in which said retention means comprises a spring biased detent ball mounted in said housing and extending into said bore for engagement with said retainer member; said retainer member having a complementary detent receiving element formed adjacent one end.

4. The combination as set forth in claim 3 in which said means for urging said housing to a second operational position is a compression spring mounted in said bore coaxially about said drive shaft, said spring acting at one end against an internal shoulder formed by the bore in said housing; and wherein the rivet head engaging means comprises a detachable socket member.

5. The combination as set forth in claim 4 wherein said detachable socket member is formed at one end with an internal shape complementary with the shape of a rivet head such that the rivet head is slidably inserted in said socket shaped portion in the second operational position.

6. The combination as set forth in claim 1 wherein one end of said drive shaft extends outwardly from one end of said housing for engagement with a source of rotational power.

7. A rivet installation apparatus for inserting and upsetting self-drilling rivets comprising:

a drive shaft, one end of said shaft being rotationally driven by a power source and the other end of said shaft adapted to engage one end of a self-drilling bit;

a housing having a bore therethrough mounted coaxially about said drive shaft, said drive shaft having free rotational and longitudinal movement relative to said housing;

means for limiting the longitudinal movement of said drive shaft relative to said housing;

a rivet head engaging means at one end of said housing, said engaging means having a bore therethrough wherein said other end of said drive shaft extends part way therethrough for cooperative engagement with the one end of the self-drilling bit;

detent means for longitudinally positioning said drive shaft relative to said housing to provide a first operational position wherein said other end of said drive shaft engages said one end of the self-drilling bit and wherein said rivet head engaging means is axially spaced from the rivet head to that rotation of said drive shaft causes a like rotation of the self-drilling rivet; and spring means urging said housing to a second operational position upon release of said detent means wherein said rivet head engaging means engages the rivet head to prevent rotational movement of the rivet head whereby continued rotational movement of said drive shaft provides an upsetting of the rivet body.

* * * * *